United States Patent Office 2,869,958
Patented Jan. 20, 1959

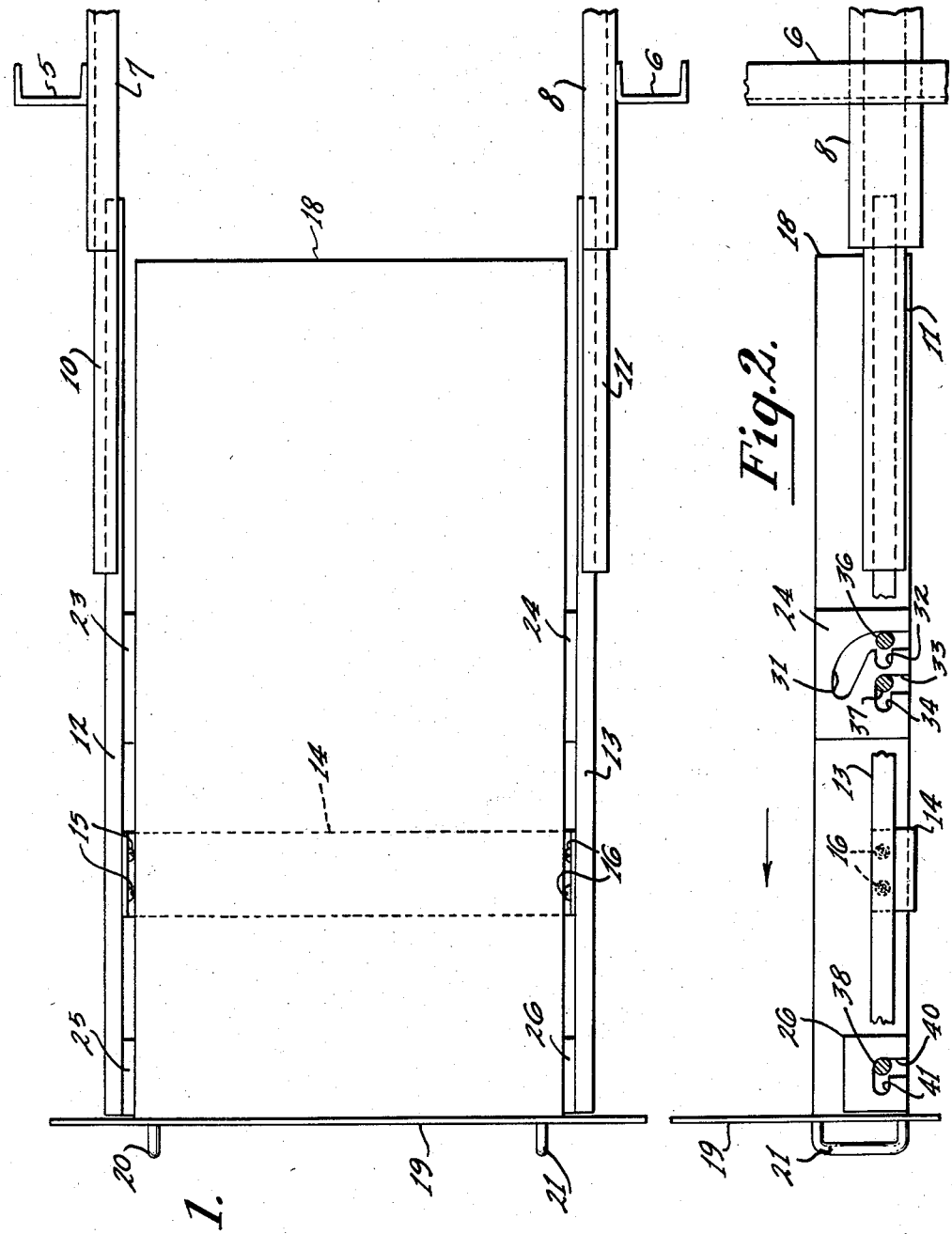

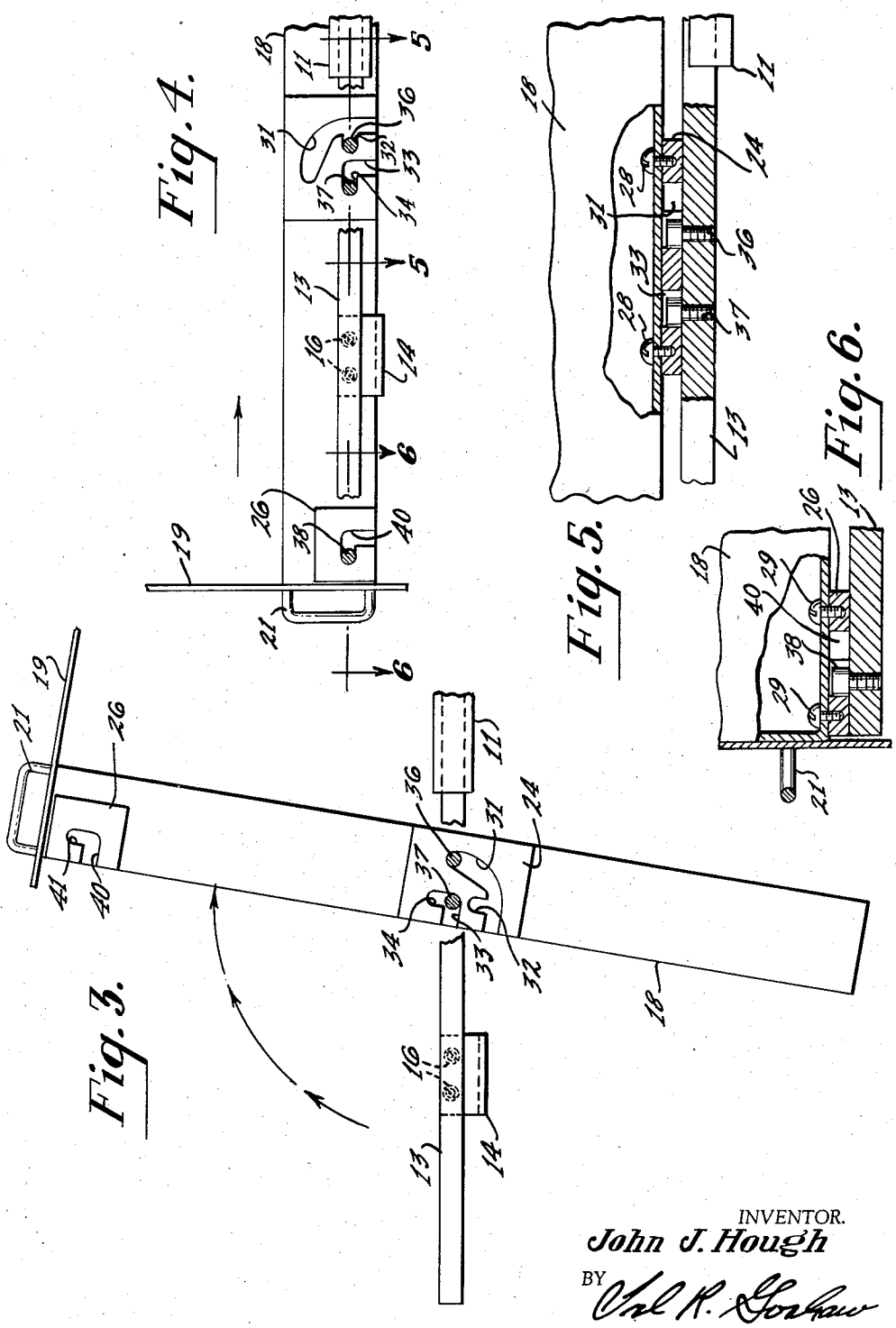

2,869,958

MECHANISM FOR MOUNTING ELECTRICAL UNITS

John Jay Hough, Granada Hills, Calif., assignor, by mesne assignments, to the United States of America as represented by the Secretary of the Air Force Application November 28, 1956, Serial No. 624,928

9 Claims. (Cl. 312—323)

This invention relates to mounting mechanisms for various types of electrical units, such as oscillators, amplifiers, and similar equipment, and particularly to mountings for rack-mounted units where rapid access to the various elements of the units may be obtained by rotation of the units. The mounting also permits the rapid removal of a unit from its rack.

One type of such a mounting is disclosed and claimed in Singer Patent No. 2,486,764, of November 1, 1949, and another type mounting mechanism is disclosed in copending application Serial No. 559,239, filed January 16, 1956, and assigned to the same assignee. The patented mounting, as well as the one disclosed in the copending application, rotates the unit to provide access to the wiring. However, the present invention, in addition to providing rotation of the units, also permits them to be rapidly removed from their supporting runners or slides of the rack. It also simplifies this form of mounting by using pregrooved plates on the unit and simple pins on the frame runners on which the electrical unit can be rotated and held in inspection position. The grooves and pins also lock the unit to the runners when the unit is in operating position.

The principal object of the invention, therefore, is to facilitate the mounting, dismounting, inspection, and repair of electrical units.

Another object of the invention is to provide an improved mounting construction for electrical units.

A further object of the invention is to provide an improved swivel or rotating mechanism for an electrical unit which is simple and economical to construct.

A still further object of the invention is to provide simple attachments to an electrical unit and its supporting frame to permit rotation of the unit for inspection.

A better understanding of this invention may be had from the following detailed description when read in connection with the accompanying drawings, in which:

Fig. 1 is a plan view of an electrical unit embodying the invention and pulled out from its operating rack position;

Fig. 2 is a side elevational view of the mounting mechanism shown in Fig. 1;

Fig. 3 is a side view showing the mechanism and electrical unit rotated to inspection and repair position;

Fig. 4 is a side elevational view showing the electrical unit in locked position;

Fig. 5 is a detail view taken along the line 5—5 of Fig. 4; and

Fig. 6 is a detail view taken along the line 6—6 of Fig. 4.

Referring, now, to the drawings, two U-shaped vertical frame members 5 and 6 support side guides 7 and 8, respectively. Slidable along guides 7 and 8 are intermediate runners or slides 10 and 11, on which electrical unit mounting guides or runners 12 and 13 are slidable. A brace strap 14 attached to runner 12 by screws 15 and to runner 13 by screws 16 maintains the ends of the runners in the proper spaced position at all times. Supported on the runners 12 and 13 is an electrical unit in the form of a chassis 18 on the top of which may be mounted electrical elements, such as tubes, condensers, inductances, etc., and under which may be the wiring interconnecting these various elements. This unit may be an oscillator, amplifier, or the like. Attached to the front of the chassis 18 is a panel 19 having handles 20 and 21.

As mentioned above, the invention involves attachments or adjuncts to the chassis and supporting runners. Attached to the sides of the chassis are two double grooved blocks or plates 23 and 24 positioned near the center of gravity of the chassis 18. At the sides of the front end of the chassis 18 are two single grooved plate or block members 25 and 26. As shown in detail in Fig. 5, the double grooved block 24 is attached to the chassis by screws 28, while in Fig. 6 the plate 26 is shown attached to the chassis 18 by screws 29.

Each of the plates 23 and 24 has two grooves 31 and 33. The groove 31 extends from the bottom of the plate with its upper end inclined to the left at substantially 45 degrees to its lower section, as viewed in Figs. 2 and 4. A locking groove section 32 extends laterally from the groove 31. The groove 33 is L-shaped and has a locking section 34. The opening or vertically extending entrance sections of the grooves 31 and 33 (as seen in Figs. 2 and 4) are parallel to each other, while the locking sections 32 and 34 are aligned horizontally. A pin 36 is in groove 31, and a pin 37 is in groove 33, these pins being press-fitted in the rail 13, as shown in Fig. 5. A similar pin 38 is shown in groove 40 of block 26, this groove having a locking section 41 in line with locking sections 32 and 34 of grooves 31 and 33. Similarly, corresponding pins are in runner 12. Thus, the only addition to the normal sliding runner mechanism 7 to 13 is the attachment of the three pins to each runner, while the only attachment to the chassis 18 are the plates 23, 24, 25, and 26.

These simple adjuncts permit the chassis 18 to be rapidly pulled out from its operating rack position, unlocked, rotated for inspection or repair, or completely removed from the runners if desired. This operation is accomplished by pulling the chassis by the handles 20 and 21 to the position shown in Fig. 2, which positions the pins 36, 37, and 38 and corresponding pins in runner 12 immediately above the vertical entrance sections of the grooves 31, 33, and 40 and corresponding groove sections in plates 23 and 25. The front end of the chassis 18 may then be lifted by the handles 20 and 21, and the chassis will rotate on pin 37 and its corresponding pin to the position shown in Fig. 3, which is approximately 10 degrees past a vertical position. The positioning of the pins and plates is such that the heavier portion of the chassis is toward the front, which permits the chassis to rest against pin 36 and its corresponding pin in runner 12 and thus remain in the position shown in Fig. 3 for inspection or servicing or adjustments. Should it be desired to remove the chassis 18 from the runners 12 and 13, it need only be lifted vertically from the position shown in Fig. 2 and transported to a work bench or other location.

To place the chassis back in operating position from an inspection position, it is rotated back to the position shown in Fig. 2, and then moved forward until the pin 36 is in the locking section 32 of groove 31, the pin 37 is in the locking section 34 of groove 33, and the pin 38 is in the locking section 41 of groove 40, as shown in Fig. 4. Corresponding groove sections and pins function for runner 12. The chassis is now locked to the runners 12 and 13, and the chassis may be slidably moved on the respective runners to an operating position in the frame. Thus, simple attachments to an electrical unit and its supporting runners will afford an economical mounting structure to permit rapid access to an electrical unit and its removal if desired.

Although the plates 23, 24, 25, and 26 are shown attached to the electrical unit 18, and the pins 36, 37, and 38 are shown attached to the runners 12 and 13, it is to be understood that the plates can be attached to the runners and the pins attached to the unit, the plates and pins functioning in the same manner as described above.

I claim:

1. A mechanism for mounting an electrical unit on side runners comprising a first pair of plates attached to the sides of said electrical unit near the center of gravity of said unit, said pair of plates having aligned grooves therein with sections substantially at right angles to one another, a second pair of plates attached to the sides of said electrical unit near one end of said unit, said second pair of plates having aligned grooves therein with sections substantially at right angles to one another, all of the aligned grooves in said plates being parallel and the sections of said grooves substantially at right angles to said aligned grooves in the plates on one side of said unit being in alignment and extending in the same direction from the aligned grooves, and a plurality of pairs of aligned pins attached to said runners and disposed each in a different one of said grooves, said unit being rotatable on one aligned pair of said pins when said pins are in the junction of said aligned grooves and the sections thereof at right angles thereto, and said unit being locked to said runners when said pins are in the ends of said sections of said aligned grooves.

2. A mechanism in accordance with claim 1 in which each of said first pair of plates has an additional groove therein, said additional groove having a section parallel with said other grooves and a section at right angles thereto, and a second section extending at substantially 45 degrees to said right angle section thereof.

3. A mechanism in accordance with claim 1 in which each of said first pair of plates has a pair of grooves therein, each of said pair of grooves having a section at right angles to another section thereof, a pair of said pins being simultaneously movable into said right angle sections of said pair of grooves when said first-mentioned pins are moved into the right angle sections of their associated grooves.

4. A mechanism for mounting an electrical unit on slidable runners comprising a pair of plates, one plate being attached to each side of said unit near the center of gravity of said unit, each plate having a pair of grooves therein with parallel sections, one parallel section of each groove being at right angles to another section of the same groove and extending in the same direction as the section of said other groove, and pins attached to said runners and positioned in said grooves and aligned in pairs, said unit being locked to said runners when said pins are in the ends of said right angle sections of said grooves and said unit being rotatable on a pair of said aligned pins when all of said pins are in the appropriate junctions of said sections of said grooves.

5. A mechanism in accordance with claim 4 in which a second pair of plates are attached to the sides of said unit near one end of said unit, said second pair of plates also having grooves therein with sections parallel with and of the same size as the sections of said first-mentioned grooves, and a second pair of pins are attached to said runners and positioned in said last-named grooves.

6. A mechanism in accordance with claim 4 in which a second pair of plates are attached to the sides of said unit near one end of said unit, said second pair of plates having grooves therein with right angle connecting sections parallel with the right angle connecting sections of the grooves of said first-mentioned plates, and a pair of pins are attached to said runners and positioned in the grooves of said second pair of plates and movable into the ends of said sections of said last-named grooves to lock said unit to said runners.

7. A mechanism in accordance with claim 6 in which one of the sections of one of said grooves in each of said first-mentioned pair of plates extends at an angle of substantially 45 degrees to the other sections of said groove, the pin in said groove moving into said 45 degree section when said unit is rotated on said first-mentioned pair of pins to hold said unit in substantially a 90 degree rotated position.

8. A mechanism for mounting, locking and rotating an electrical unit on slidable runners comprising a pair of plates located near the center of gravity of said unit, each plate having grooves therein with certain sections of said grooves parallel with each other, one section of each groove being substantially at right angles to its other section, and a plurality of pins located each in a different one of said grooves, said unit being locked to said runners when said pins are in the ends of said right angle sections of said grooves and rotatable on a pair of said pins when said pins are in the junction between the right angle sections of said grooves.

9. A mechanism in accordance with claim 8 in which a second pair of grooved plates are provided spaced from said first pair of plates together with a second pair of pins and positioned in the grooves of said second pair of plates, said unit being detachable from said runners when said pins are in the junctions between the right angle sections of said grooves.

References Cited in the file of this patent

UNITED STATES PATENTS

| 2,584,173 | Van Fowler | Feb. 5, 1952 |
| 2,749,200 | Kuss | June 5, 1956 |

FOREIGN PATENTS

| 539,722 | Great Britain | Sept. 22, 1941 |